(12) United States Patent
Schloesser et al.

(10) Patent No.: US 12,669,424 B2
(45) Date of Patent: Jun. 30, 2026

(54) MASS CONCENTRATION DETERMINATION OF PARTICLES SMALLER THAN 2.5 MICRONS IN AIR

(71) Applicant: American Ecotech L.C., Warren, RI (US)

(72) Inventors: Herbert Schloesser, Warren, RI (US); Stephen Petrarca, Warren, RI (US); Anthony Pacheco, Warren, RI (US); Andrew Tolley, Warren, RI (US)

(73) Assignee: American Ecotech L.C., Warren, RI (US)

( * ) Notice: Subject to any disclaimer, the term of this patent is extended or adjusted under 35 U.S.C. 154(b) by 131 days.

(21) Appl. No.: 18/502,446

(22) Filed: Nov. 6, 2023

(65) Prior Publication Data

US 2024/0151626 A1     May 9, 2024

Related U.S. Application Data

(60) Provisional application No. 63/422,764, filed on Nov. 4, 2022.

(51) Int. Cl.
*G01N 15/06* (2024.01)
*G01N 15/075* (2024.01)

(52) U.S. Cl.
CPC ........... *G01N 15/06* (2013.01); *G01N 15/075* (2024.01)

(58) Field of Classification Search
CPC .............................. G01N 15/06; G01N 15/075
See application file for complete search history.

(56) References Cited

U.S. PATENT DOCUMENTS

| | | | |
|---|---|---|---|
| 6,055,052 A | 4/2000 | Lilienfeld | |
| 7,671,988 B2 | 3/2010 | Dal Sasso et al. | |

(Continued)

FOREIGN PATENT DOCUMENTS

| | | | | |
|---|---|---|---|---|
| CN | 102046814 A | * | 5/2011 | ....... G01N 33/54306 |
| CN | 204286486 U | * | 4/2015 | |

(Continued)

OTHER PUBLICATIONS

Beuttell et al. "Instruments for the measurement of the visual range." Journal of Scientific Instruments 26.11: 357 (1949); retrieved from the Internet on Sep. 24, 2014, URL: http://iopscience.iop.org (4 pages).

*Primary Examiner* — Michelle M Iacoletti
*Assistant Examiner* — Jarreas Underwood
(74) *Attorney, Agent, or Firm* — Nixon Peabody LLP

(57)     ABSTRACT

A method for determining airborne concentrations of an ensemble of particulate matter below the size fraction 2.5 μm in aerodynamic diameter ($PM_{2.5}$). The method is to be composed of a sharp cut $PM_{2.5}$ cyclone, optical sensor capable of producing scattering coefficients dependent on particle size, temperature and humidity sensors for adapting to changes in the environment, and a processing system for applying logic-based algorithm to convert raw sensor values into PM concentrations. The optical sensor is a dual wavelength integrating nephelometer capable of yielding particle characteristic scattering coefficients at two wavelengths. The particle scattering ratios between two wavelengths are used in conjunction with temperature and humidity in the method's algorithm to reduce particle growth bias and to ultimately yield $PM_{2.5}$ concentrations.

13 Claims, 8 Drawing Sheets

(56) References Cited

U.S. PATENT DOCUMENTS

| | | | | |
|---|---|---|---|---|
| 2016/0274024 A1* | 9/2016 | Han | ................... | G01N 29/2425 |
| 2021/0270711 A1* | 9/2021 | Martins | ............. | G01N 15/0255 |

FOREIGN PATENT DOCUMENTS

| | | | | | |
|---|---|---|---|---|---|
| CN | 107478555 A | * | 12/2017 | ............ | G01N 15/06 |
| CN | 109520899 A | * | 3/2019 | ............ | G01N 15/06 |
| CN | 113686746 A | * | 11/2021 | ............ | G01N 15/06 |
| KR | 101156103 B1 | * | 6/2012 | ............ | G01N 21/47 |
| KR | 20220011882 A | * | 2/2022 | ......... | G01N 15/0266 |

* cited by examiner

Lambertian light source

Detection cone illumination for PMT to measure total scattering from 10° to 171°

MASS CONCENTRATION DETERMINATION OF PARTICLES SMALLER THAN 2.5 MICRONS IN AIR

CROSS-REFERENCE TO RELATED APPLICATIONS

The present application claims priority to and the benefit of U.S. Provisional Application No. 63/422,764, filed Nov. 4, 2022, the contents of which are hereby incorporated by reference herein in their entirety.

GOVERNMENT LICENSE RIGHTS

This invention was made with government support under DE-SC0015031 awarded by the U.S. Department of Energy, Office of Science. The government has certain rights in the invention.

TECHNICAL FIELD

The invention described within is generally related to the field of environmental ambient air quality monitoring. Specifically, the outlined configuration is focused on rapid, real-time air quality monitoring through quantifying concentrations of airborne particulate matter classified as $PM_{2.5}$.

BACKGROUND

Air quality is and has been a field of interest for different governing bodies who are concerned with conditions that could have negative health implications for the communities they represent. Their main goal is monitoring and regulating the abundance and release of several different environmental contaminants and constituents that may be introduced either by industrial production or environmental events such as wildfires. A major contaminant of interest is airborne particulate matter (PM)—more specifically, and more relevant to this topic, ultrafine PM which is classified as $PM_{2.5}$ and composed of particles with a diameter <=2.5 μm.

The approved and certified Federal reference method for accurate quantification of $PM_{2.5}$ levels relies on a gravimetric measurement of a filter before and after passing ambient air through this filter medium for 24 h. PM will be embedded in this filter increasing the weight over time, with this change being the resulting total mass accumulated for a given volume of air that was sampled. Though this instrumentation provides a reliable option for accurate measurement of $PM_{2.5}$, it comes with several drawbacks including its temporal resolution of 1 sample per day, its reliance on sample preparation of weighting a physical object before and after sample collection, and its requirement of having an operator collect and replace this filter each day. These inherent characteristics increase the burden on the user along with increasing the potential for sample contamination due to physically handling the filter before and after sampling. Additional losses occur when volatile organics within a sample sublimate over time, which can be amplified if the filter paper is not immediately weighed after collection. The described method within looks to provide an alternative for accurate quantitation of $PM_{2.5}$ that remedies these specific issues.

Nephelometry is an analytical technique measuring light scattered off PM suspended in ambient air. Configuring the instrument design to integrate all scattering over a specific area was first introduced and published in 1949 by Beuttell and Brewer. Since this time, integrating nephelometers have become a common instrument implemented for measuring the visible range of ambient air which is directly linked to the total suspended PM. Though PM is being measured directly during this measurement, quantitation of $PM_{2.5}$ is difficult when applying a single wavelength. However, introducing a second wavelength provides the ability to infer a relative average PM diameter through the intrinsic phenomenon of smaller particles scattering shorter wavelengths of light more than longer wavelengths. When a supplementary wavelength of light that is longer than the first is included, direct comparison of the scattered light will provide insight into its inherent wavelength dependent scattering properties or scattering Angstrom exponent (SAE). Smaller particles lead to a larger difference in this value while larger particles cause the scattering over all wavelengths to converge.

A very critical detail to consider when working to quantify $PM_{2.5}$ is the amount of moisture that is present in ambient air. Elevated levels of moisture will result in aggregation increasing the detected particle's diameter and potentially leading to further growth through deliquescence if the air becomes too saturated. It is necessary to take this into account for accurate measurements of the incoming air. This can be done by either measuring temperature and relative humidity to correct for this effect through calculating dew point, decreasing the relative humidity below a threshold where this effect would cause issues, or both. Omitting corrections and controlling will lead to inaccurate readings.

Through the combination of nephelometry at several wavelengths, correcting readings through direct comparison of scattering, and correcting readings through dew point calculations, an algorithm and method for quantitation of $PM_{2.5}$ can be produced. Since this method relies on indirect sampling, no consumables or user input is required after initial setup. Also, the described method is a continuous means of analysis, resulting in a system facilitating real time measurements that removes all downsides of conventional Federal reference methods and introduces several quality-of-life improvements.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

Disclosed is a method for implementing and optimizing the quantitation of particulate matter as described above.

The inventors have developed a particle to mass scattering data processing algorithm to be used in tandem with an integrating nephelometer. The objective of this method is to provide continuous real-time measurements of PM in air. Scattering coefficients from integrating nephelometers, such as those described in U.S. Pat. No. 7,671,988 B2, are collected and processed by the developed method's algorithm. This algorithm is capable of yielding PM mass concentrations with units of microgram per cubic meter ($\mu g/m^3$) in air from scattering coefficients. The implemented main exemplary embodiment accomplishes this by providing a multiwavelength optical sensor for measurement of ambient PM concentration and optical characteristics relating to relative particle diameter, a temperature sensor for ambient air conditions, and a separate temperature sensor and relative humidity sensor for within a measurement cell adjacent to incident light. Size distributions and optical properties are used to dictate algorithmically adjusted levels, and dew point calculations are used for correcting scattering coefficients to produce the final particulate concentration calculations.

According to one embodiment of the present disclosure, a method for real-time monitoring of total airborne particulate matter includes measuring size characteristics of sampled ambient airborne particulate at several wavelengths by an optical sensor. The method further includes volumetric flow control using a mass flow sensor, internal pump, pressure sensor, and a temperature probe affixed to a sharp cut cyclone inlet. The method further includes measuring relative humidity and temperature of an air sample for dewpoint calculations of sampled aerosol with a humidity and temperature sensor. The method further includes maintaining a relative humidity threshold with a sample conditioning system to maintain. The method further includes responsive to measured size characteristics and dew point measurements, providing an adjusted airborne particle concentration value.

According to one aspect of the above embodiment, the optical sensor is a nephelometer. According to one aspect of the above embodiment, the nephelometer is an integrating nephelometer. According to a further aspect of the above embodiment, the nephelometer is a multi-wavelength nephelometer. According to a further aspect of the above embodiment, the multi-wavelength nephelometer operates at two wavelengths. According to a further aspect of the above embodiment, the wavelengths applied by the nephelometer range from approximately 410 nm to approximately 490 nm, and approximately 590 nm to approximately 680 nm. According to a further aspect of the above embodiment, the nephelometer has a truncated integrating range from 10-171°. According to a further aspect of the above embodiment, the PM size selective inlet is a $PM_{2.5}$ sharp cut cyclone. According to a further aspect of the above embodiment, the flow rate through $PM_{2.5}$ sharp-cut cyclone is volumetrically controlled specific to the chosen sharp-cut cyclone. According to a further aspect of the above embodiment, the first light source is set to 450 nm and the second light source set to 635 nm. According to a further aspect of the above embodiment, an air mass sample heater is included to reduce humidity, as such RH is controlled to be <35%. According to a further aspect of the above embodiment, the method to determine $PM_{2.5}$ particle concentration is comprised of a segmented mass scattering efficiency function utilizing the scattering Ångström exponent derived by measuring 2 scattering coefficients at different wavelengths. According to a further aspect of the above embodiment, the mass scattering efficiency function is comprised of 2 exponential decay functions and a polynomial function connecting both exponential functions. According to a further aspect of the above embodiment, the scattering coefficients have a dewpoint correction factor applied. According to a further aspect of the above embodiment, the resulting number is the airborne particle concentration in $PM_{2.5}$. According to one aspect of the above embodiment, the resulting value is presented in $\mu g/m^3$.

BRIEF DESCRIPTION OF DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1:
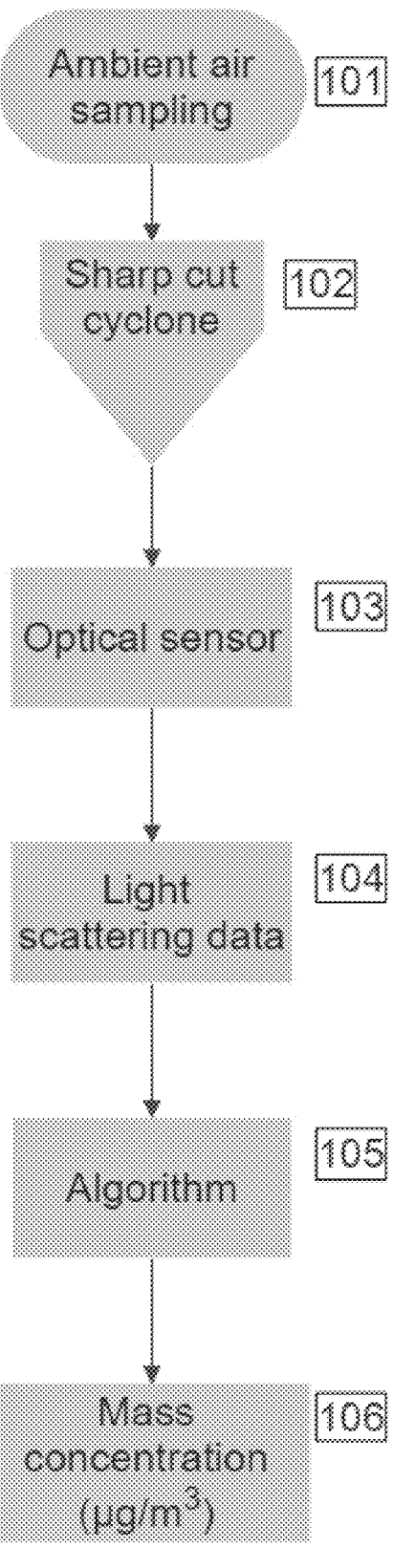
FIG. 1 is a flow chart of the method configuration and steps, according to aspects of the present disclosure.
Figure 2:
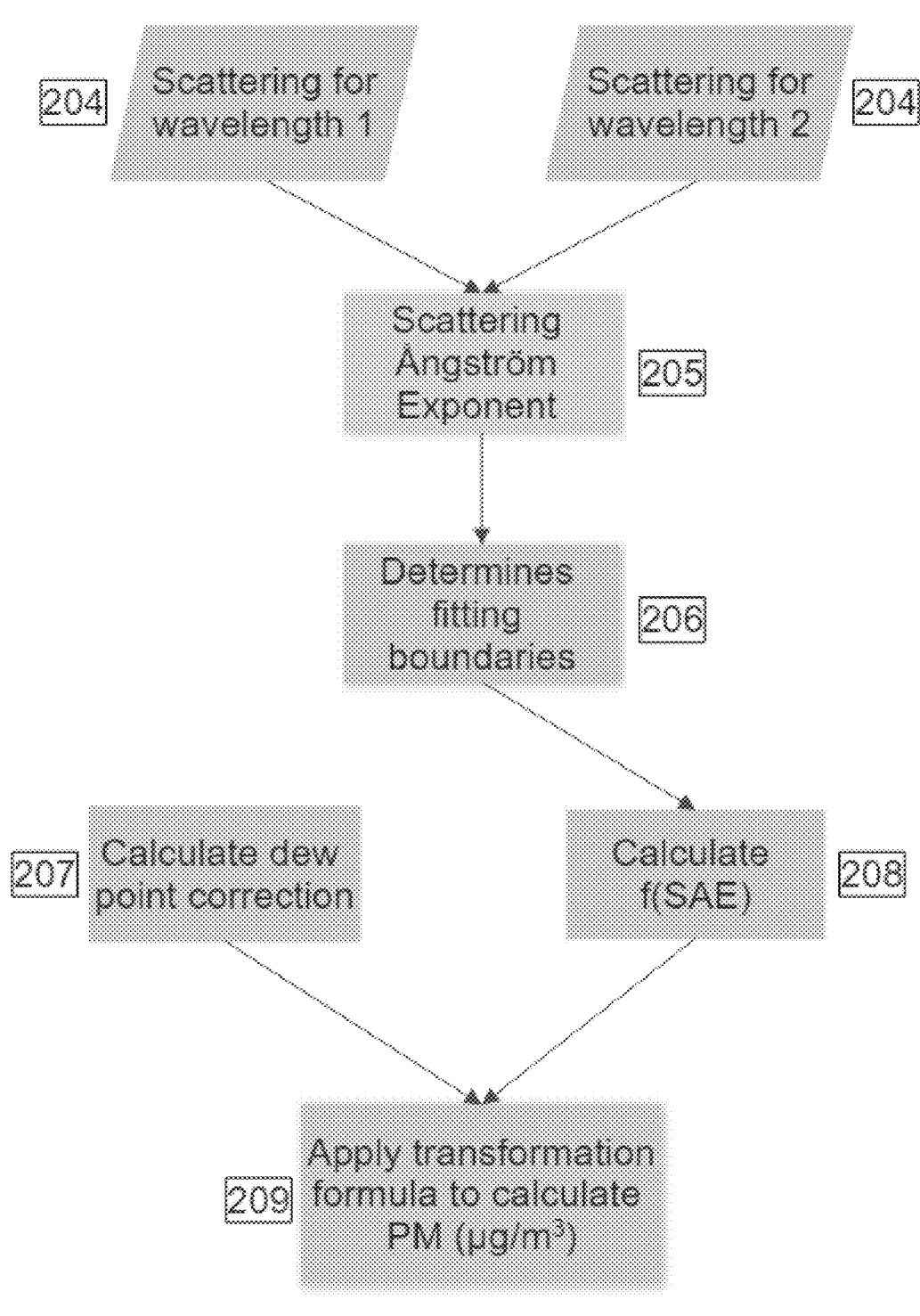
FIG. 2 is a flow chart of the algorithm steps, according to aspects of the present disclosure.
Figure 3:
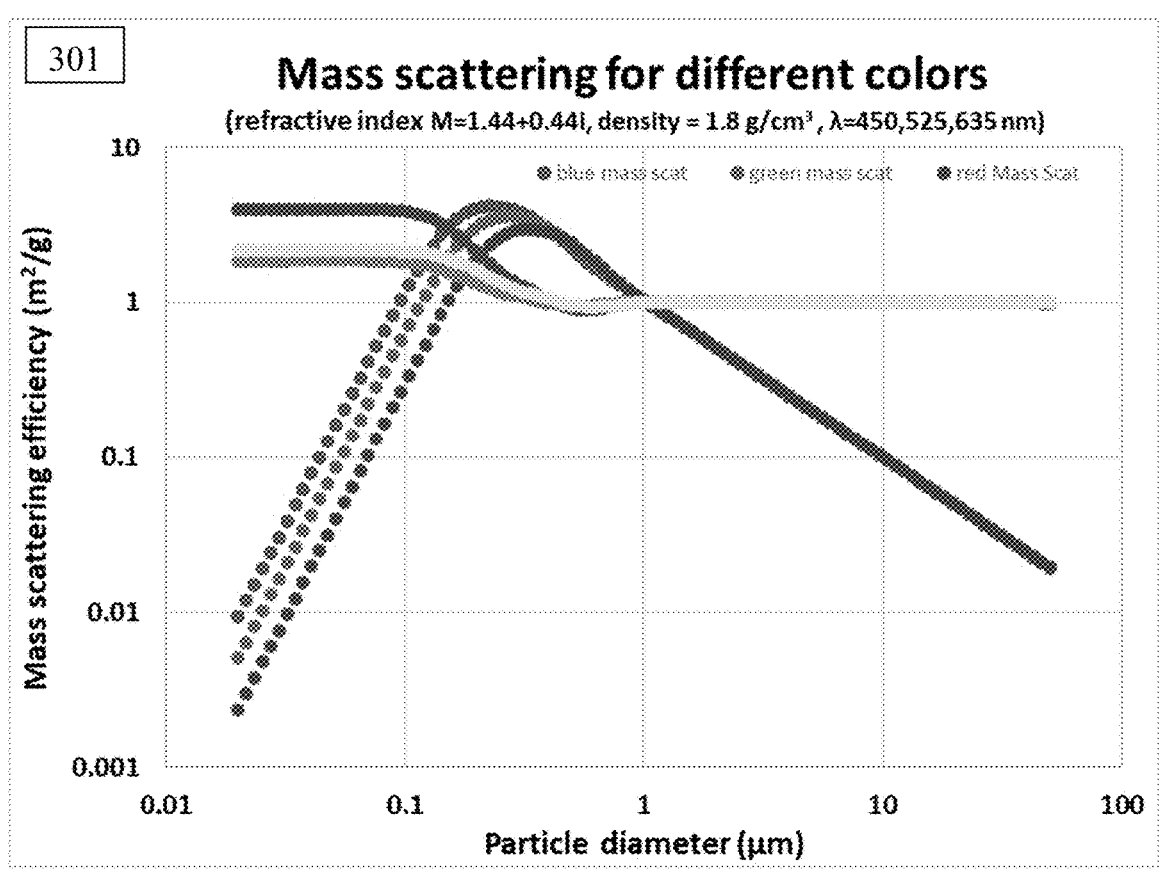
FIG. 3 is a plot depicting single particle Mie scattering for three wavelengths and their color combinations as a function of particle mode diameter.

While the invention is susceptible to various modifications and alternative forms, specific embodiments have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Described is a setup for measuring PM smaller than 2.5 $\mu m$ ($PM_{2.5}$) using a multi-wavelength integrating nephelometer (103) with truncation angles (10-171°, 801) capable of measuring scattering coefficients for at least two different wavelengths. Measuring different sizes of PM than what is described here, can be achieved by choosing the appropriate wavelengths, i.e., larger wavelength is needed for larger PM mean mode diameters.

Integrating nephelometers can measure the scattering of incident light in a sample of ambient air due to the presence of particulate matter in real-time. Specifically, the scattering coefficient $b_{sp}$ is determined for 2 selectable wavelengths simultaneously, out of the any combination of wavelengths. The wavelengths used for developing the method were: 450 nm—Blue, 525 nm—Green, and 635 nm—Red. It has been determined that at least 2 wavelengths must be used to achieve the proper representation of the particle mass concentrations.

To achieve particle size separation, a custom $PM_{2.5}$ cutoff sharp cut cyclone (102) is used as the inlet for the integrating nephelometer. For different PM size measurements (e.g., $PM_{10}$), the appropriate size separating cyclone should be used. The flow rate for the integrating nephelometer was volumetrically controlled with a mass flow sensor, internal pump, pressure sensor, and a temperature probe affixed to the cyclone to help control the proper flow rate through the system. The measured values are adjusted automatically and in real-time by on-board temperature and pressure sensors. Calibrations and zero/span checks are fully automatic, with checks initiated automatically, at user selectable intervals. A processor-controlled inlet heater can eliminate the effects of relative humidity (RH) on scattering behavior (103). To reduce humidity effects the method requires a "dry sample" of particles, as such the RH is controlled to be <35%.

Principles of the Integrating Nephelometer

The loss of light through a medium (e.g., air, particles, glass, etc.) is called light extinction. In ambient air light extinction is caused by the properties of both light absorption and light scattering from gases and particulate matter. The total extinction coefficient, $b_{ext}$ is the sum of these properties. Light extinction is generally described by the Beer-Lambert law:

$$I = I_0 \cdot e^{-b_{ext} \cdot x} \qquad \text{Equation (1)}$$

where $I_0$ represents the incident light intensity, I the light intensity after passing a distance (x) through the media, and $b_{ext}$ is the total extinction coefficient. $b_{ext}$ is the sum of $b_{scat}$ and $b_{abs}$. $b_{scat}$ and $b_{abs}$ are called the scattering and absorption coefficients. Scattering and absorption are impacted by gases and particles, therefore a subdivision of the coefficients is usually made by $b_{scat}=b_{rg}+b_{sp}$; with $b_{rg}$ representing the Raleigh scattering of molecules in air and $b_{sp}$ the particle scattering. $b_{abs}=b_{ag}+b_{ap}$; where $b_{ag}$ is the absorption by gases (e.g., NO$_2$) and $b_{ap}$ is the absorption by particles. The total scattering coefficient, $b_{scat}$, can be determined using the total loss of light by scattering by adding up the scattering intensities in all possible directions. Only integrating nephelometers measure the scattered light over the whole scattering angle range in one single measurement. In the integrating nephelometer $b_{scat}$ is measured and $b_{sp}$ is generated by subtracting $b_{rg}$ from $b_{scat}$. The Raleigh gas scattering $b_{rg}$ is measured during zero cycles or calibration. Typically, the scattering of particles is the major contribution to the light extinction. The integrating nephelometer used for testing and development purposes was the 2WIN (103). Briefly, the light detector is a photomultiplier tube (PMT) and is placed on the center axis of the instrument. The defined measurement cone is illuminated with the light source from the top and placed at a specified distance "d" which is perpendicular to the center axis (801). The scattering of particles from the orientation is observed by the PMT. The light source has a Lambertian (cosine) shaped intensity profile, and the measured intensity B is directly proportional to the total scattering coefficient $b_{scat}$ and can be expressed as:

$$B = I_o \cdot b_{scat}/2\pi \cdot d \qquad \text{Equation (2)}$$

where $I_o$ is the intensity of the light source, and d is the distance from the light source to the measurement cone. In the 2WIN, the intensity $I_o$ is measured using a shutter that periodically blocks the PMT. The shutter is designed such that a given percentage of the illuminating light is allowed to reach the PMT when closed. This way the measurement signal is proportional to the lamp intensity $I_o$ and the instrument calibration will establish the proportionality factor.

The light scattering is typically dependent on particle size, material, and wavelength used. The 2WIN method approach utilizes the simultaneous measurement of scattering at 2 wavelengths (104 & 204). This allows the determination of the Scattering Ångström Exponent (SAE, 205). The SAE describes the difference in scattering for two different wavelengths and can be determined using the following relationship:

$$SAE = -\frac{\ln(b_{l_1}) - \ln(b_{l_2})}{\ln(l_1) - \ln(l_2)} \qquad \text{Equation (3)}$$

where b represents the scattering coefficients and/denotes the wavelengths used to determine the coefficient. The SAE itself is inversely related to the average size of aerosol particles measured (i.e., the smaller the particles the larger the exponent). Thus, the SAE describes the average size (mode diameter) of the ensemble of particles measured.

Applying Theory to Develop the Method.

Figure 4:
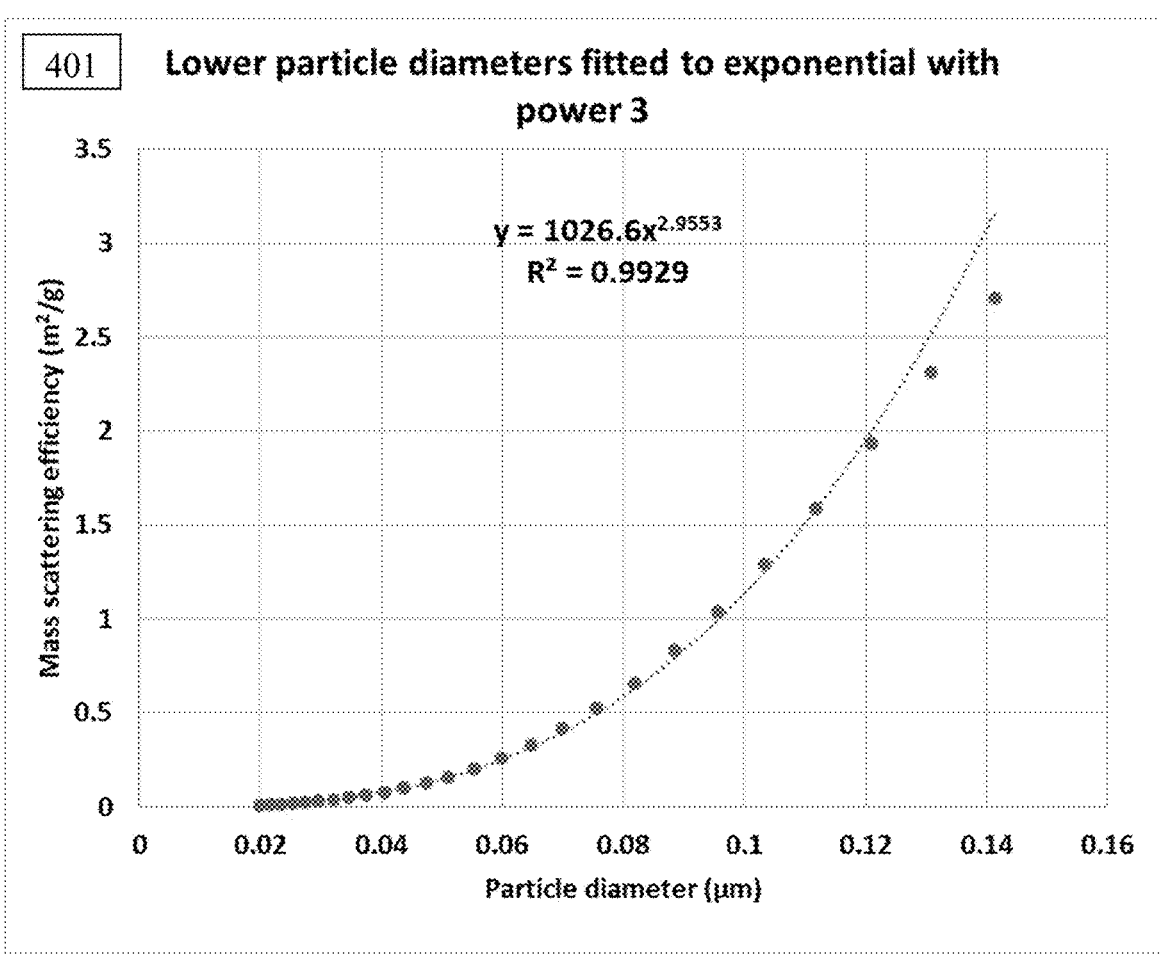
FIG. 4 is a plot for the fitting equations representing blue single particle Mie scattering, according to aspects of the present disclosure.
Figure 5:
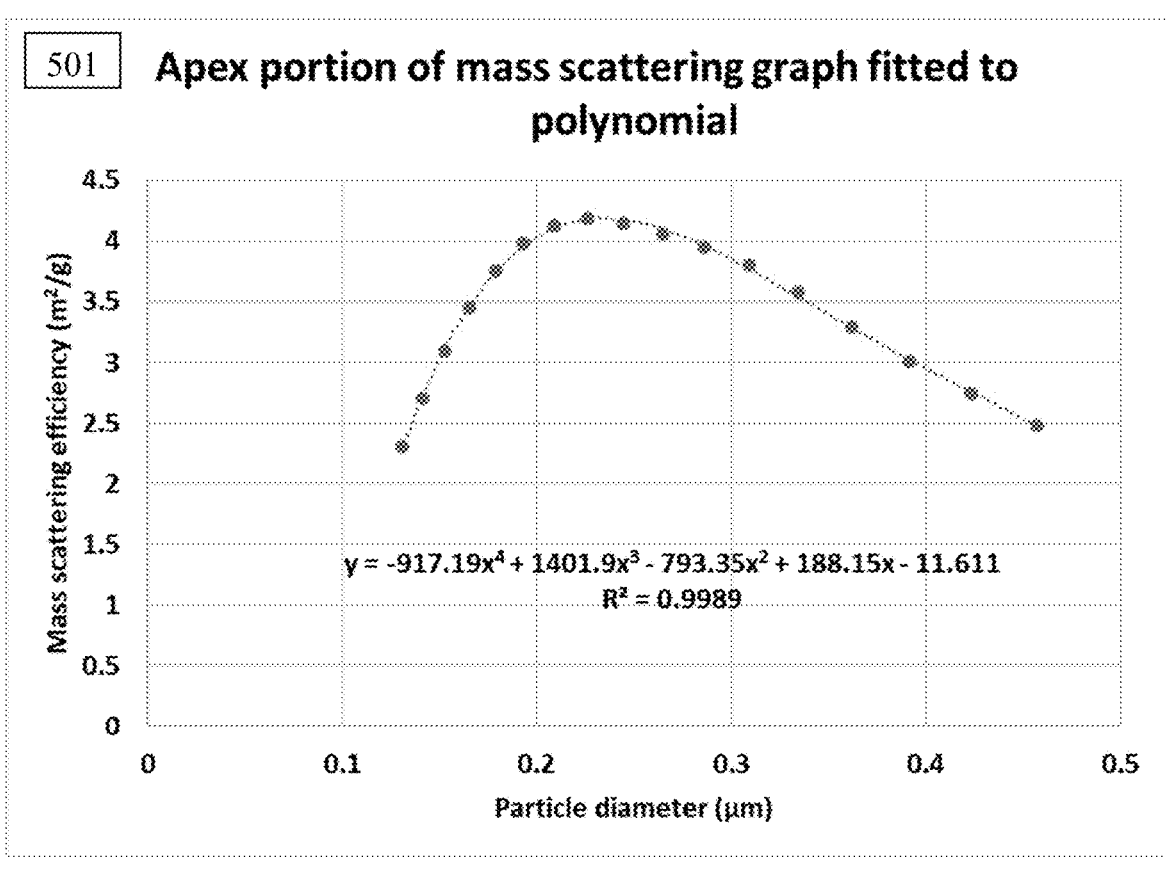
FIG. 5 is another plot for the fitting equations representing blue single particle Mie scattering, according to aspects of the present disclosure.
Figure 6:
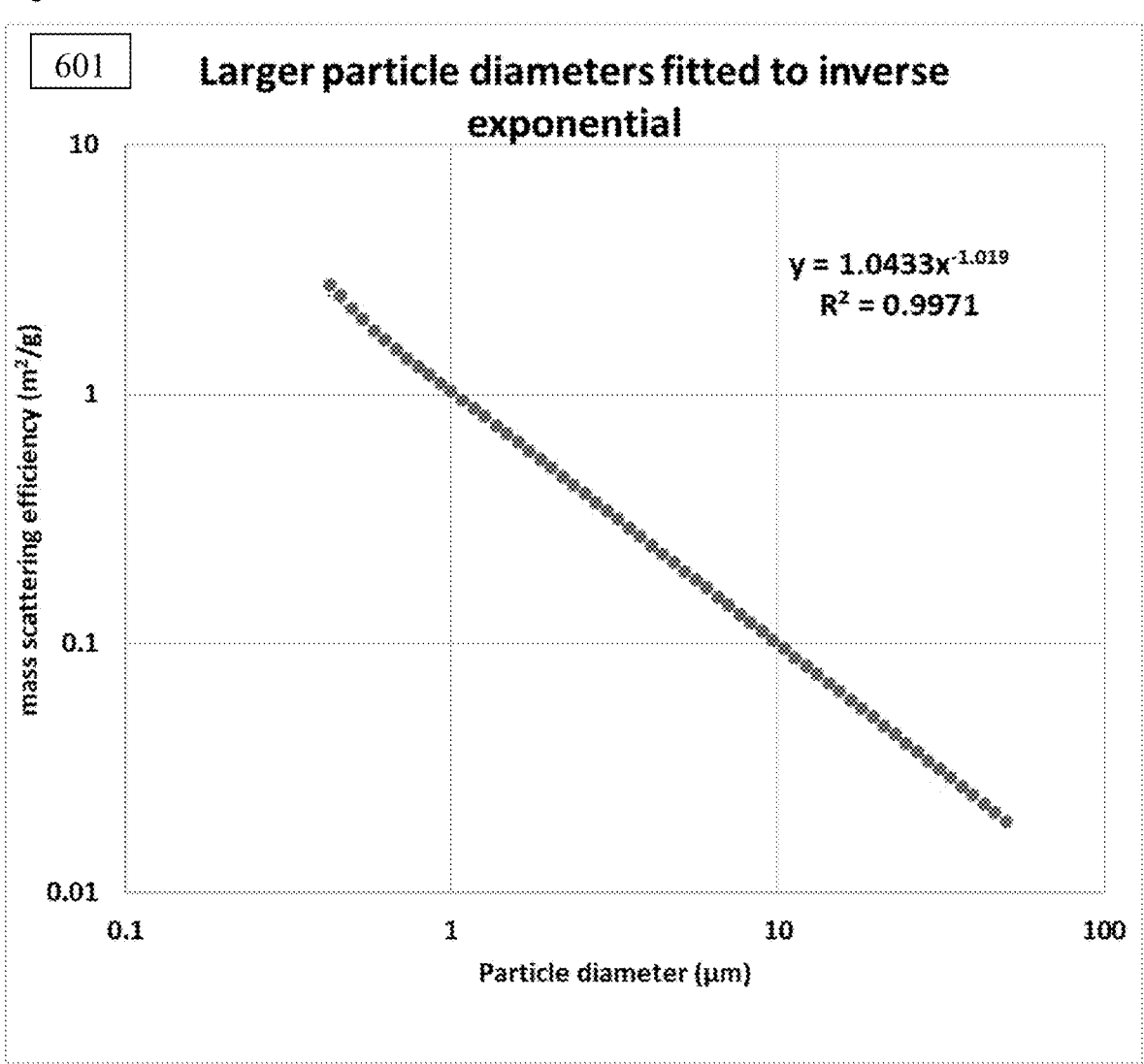
FIG. 6 is another plot for the fitting equations representing blue single particle Mie scattering, according to aspects of the present disclosure.

Mie mass scattering calculations for 3 different wavelengths (301) were performed to develop the algorithm (105). The resulting mass scattering efficiencies yield a similar shape for all colors. The shorter wavelengths deliver a higher intensity scattering and are impacted more due to smaller particle diameters, while the longer wavelengths generally have lower scatterings and impacted more due to larger particle diameters. Below 0.1 μm diameter the ratios are constant indicating that the exponential decay for all 3 colors is the same. The exponential decays for all ratios are superimposed on each other for particles larger than 0.9 μm and the ratios between the colors are 1. FIGS. 4-6 show a segmented data fitting approach with 2 exponential functions (401 & 601) and a polynomial (501) in the center area covering the blue mass scattering efficiency vs particle diameter. Using the SAE as surrogate for the particle diameter and the mass scattering efficiencies at different geometric mean particle diameters a series of equations were developed to calculate PM concentrations in μg/m³, in this case PM$_{2.5}$. The Mie calculations were performed for single particle scattering (401, 501, and 601), and at differing refractive indexes. There are observed oscillations in the SAE with changing particle size, these oscillations would be detrimental to the method but integrating nephelometers do not measure single particle scattering, they measure the scattering of an ensemble of particles in the sample flow. Thus, one can assume that from a diameter point of view, the mode diameter of the measured aerosol ensemble is the guiding parameter. Mie calculations for SAE determined by lognormal distributed particles with different geometric standard deviations (GSD) had smoothed out these oscillations. Also, it was shown that the exponential curvature of the SAE with respect to particle size changed slightly with GSD. This would allow a unique determination from the SAE to the particle diameter.

Figure 7:
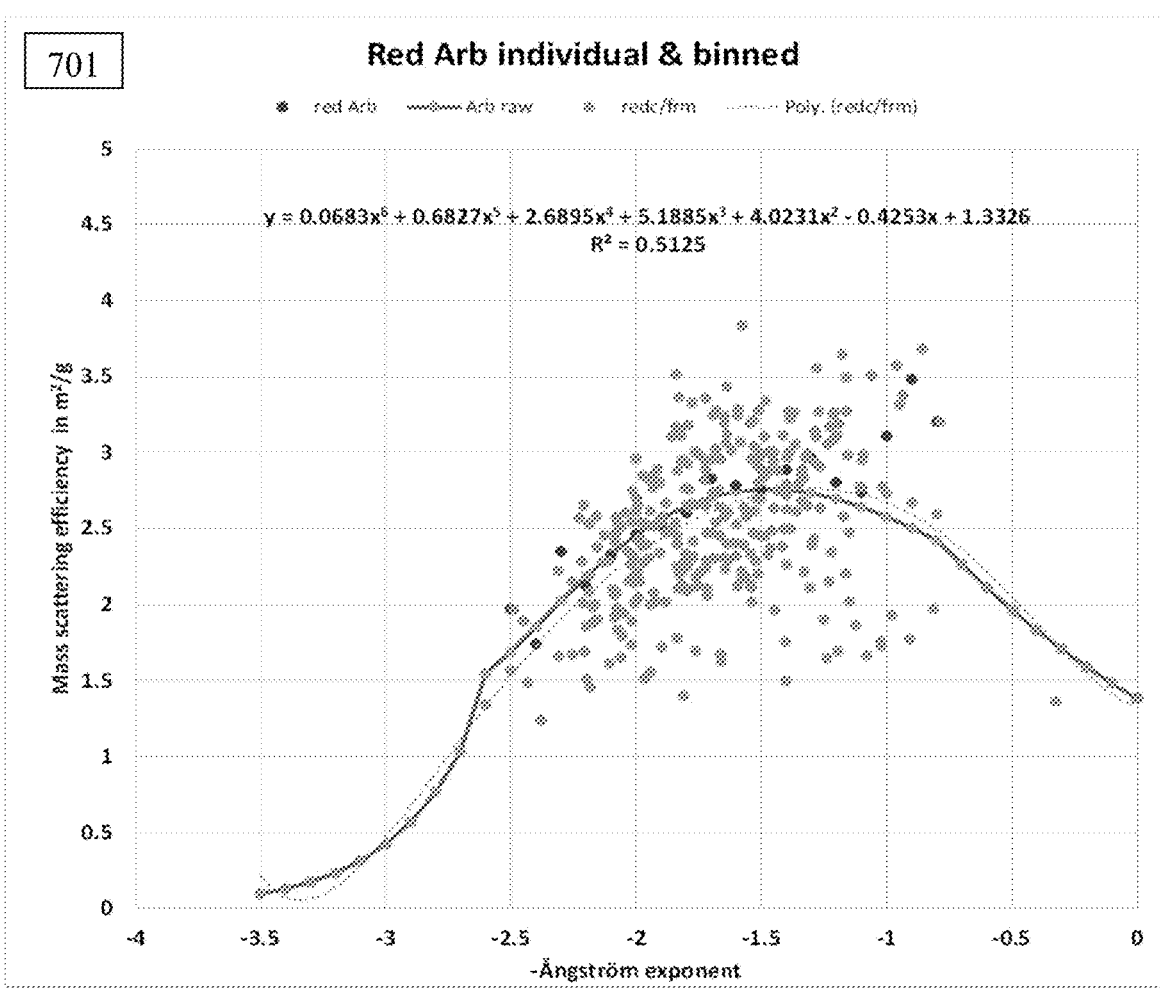
FIG. 7 is a plot depicting mass scattering efficiency of real data plotted against the scattering angstrom exponent (SAE), according to aspects of the present disclosure.
Figure 8:
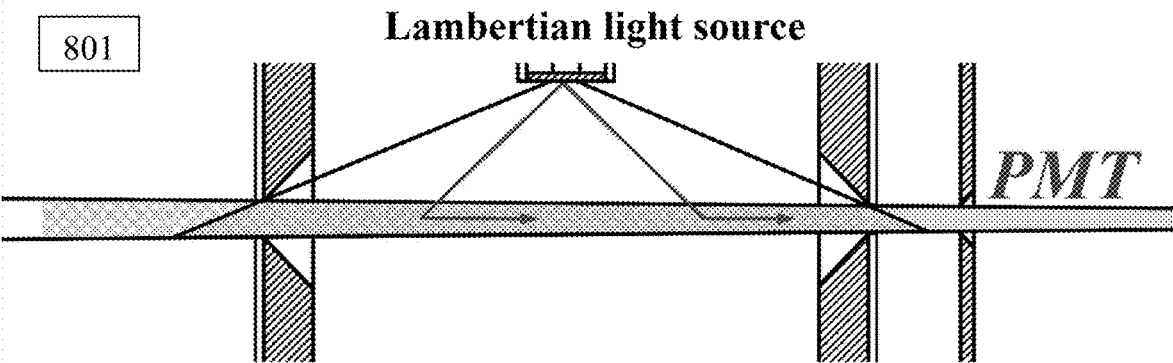
FIG. 8 is a schematic view of the optical path for integrated scattered light, according to aspects of the present disclosure.

A polynomial relationship could describe the mass scattering over a wide range, but since the single particle calculations are not fully applicable; real experimental data is needed for the determination of the mass scattering efficiency relationship with the measured SAE (701). FIG. 7 shows the mass scattering efficiency vs the red/blue SAE (A$_{rb}$). The grey datapoints are the measured 24-hour red scattering ($Mm^{-1}$) divided by the reference method ($PM_{2.5}$) values in ug/m³. The red datapoints are the sum of all scattering values within a 0.1 SAE bin divided by the sum of the reference method values within the same bin. The daily averages did not have negative SAEs smaller than −2.5. Included is an exponential drop toward −4 SAE which represents the scattering of gas molecules. In a similar way an exponential function was used for SAE greater than −0.7. A Sahara dust event led to the ability to further finetune the algorithm when SAE was 0. Since all colors read the same, the common calibration factor of 0.724 (or 1.381 m²/g) was implemented.

Specific Embodiment for the Method to Determine $PM_{2.5}$.

The determined theoretical SAE boundaries for the fitting equations have allowed for the determination of real-time concentrations for $PM_{2.5}$ (206). The condensed equations to perform these calculations are explained for an integrating nephelometer and are as follows for an integrating nephelometer optical cell geometry with a truncation angle of 10-171° and a flow rate of 2 LPM.

SAE from the Ambient Scattering.

The analysis of 3 colors and 6 SAE combinations were performed to support the method for the determination of the mass scattering efficiency using the SAE. To fit the analyzed data into the algorithm it was split the equation into 5 parts, separated by predetermined low and high cut-off boundaries. For example, for a calculated SAE between red (625 nm) to Blue (450 nm), $A_{rb}$ and the equation used to determine mass concentration is as follows (205):

$$SAE \text{ for } A_{rb} = -\frac{\ln(b_{635}) - \ln(b_{450})}{\ln(635) - \ln(450)} \qquad \text{Equation (4)}$$

Dew Point Correction and Final PM Determination.

Dew point correction for first wavelength scattering coefficient (207):

$$DPcorr = 1/(0.005185 * Dewpoint + 0.804688) \qquad \text{Equation (5)}$$

Applying this dewpoint correction yields the following particle concentration ($PM_{2.5}$) equation:

$$PM_{2.5}(\mu g/m^3) = DPcor * b_{635 \ nm}/f(Arb) \qquad \text{Equation (6)}$$

where $f(A_{rb})$ is calculated as follows (208):

For $A_{rb} - \infty$ to $- 3.5$      Equation (7)

$$f(Arb) = 1/\left(3224.689 * e^{(2.980287*(-3.5))}\right)$$

For $A_{rb} - 3.5$ to $< -2.50$      Equation (8)

$$f(Arb) = 1/\left(3224.689 * e^{(2.980287*(A_{rb}))}\right)$$

For $A_{rb} - 2.5$ to $< -0.7$      Equation (9)

$$f(Arb) = \frac{0.9615}{(0.04582 * A_{rb}^6 + 0.2149 * A_{rb}^5 + 0.3917 * A_{rb}^4 + 1.0416 * A_{rb}^3 + 1.5601 * A_{rb}^2 + 0.3298 * A_{rb} + 2.0898) + 2.73}$$

For $A_{rb} - 0.7$ to $< 0.8$      Equation (10)

-continued $$f(Arb) = 1/\left(1.3811735 * e^{(-0.705*(A_{rb}))}\right)$$

For $A_{rb}$ 0.8 to $\infty$      Equation (11)

$$f(Arb) = 1/\left(1.3811735 * e^{(-0.705*0.8)}\right)$$

Operation

An algorithm to calculate mass scattering should be integrated directly into the integrating nephelometer software but can also be used to process the data after collecting the scattering coefficients. Operation and data integrity depend on the proper operation of the nephelometer, including regular zero and span checks, proper humidity control, flow rate control, and cyclone maintenance. PM concentration reporting frequency is on the same order as the scattering frequency collection (209).

Alternative Embodiments

Many other variations of this method could exist by slightly changing the integrating nephelometer wavelengths and thus the fitting coefficients. Any integrating nephelometer set to measure multiple wavelengths would be able to adapt this method to determine the fitting coefficients required to transform the data. Extensive testing would be required to compare new embodiments of this method to federally regulated gravimetric instruments for determining the efficacy of the adaptation. The method is to determine PM concentrations with a multi-wavelength integrating nephelometer, utilizing at least 2 wavelengths. Alternate embodiments will calculate the SAE and use a segmented mass scattering efficiency function with 2 exponential functions and one polynomial function to explain an ensemble of particle scattering behavior. The methods should use the appropriate particle separator/cyclone for the desired PM size and operate in a "dry mode" with RH values <35%.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more embodiments, equivalent alterations and modifications will occur or be known to others skilled in the art upon the reading and understanding of this specification and the annexed drawings. In addition, while a particular feature of the invention may have been disclosed with respect to only one of several embodiments, such feature may be combined with one or more other features of the other embodiments as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method for real-time monitoring of total airborne particulate matter, the method comprising:

volumetrically controlling a flow rate into a sharp cut cyclone using a flow sensor, an internal pump, a pressure sensor, and a temperature probe affixed to an inlet of the sharp cut cyclone to generate an air sample;

measuring relative humidity and temperature of the air sample for determining a dewpoint correction factor;

maintaining a relative humidity threshold of the air sample with a sample conditioning system;

determining a first scattering coefficient of airborne particles in the air sample for a first optical wavelength via an optical sensor;

determining a second scattering coefficient of airborne particles in the air sample for a second optical wavelength, via the optical sensor;

determining a scattering Ångström exponent (SAE) using at least the first scattering coefficient and the second scattering coefficient; and determining an airborne particle concentration for a range of particle sizes based at least on the SAE, the first scattering coefficient further used outside of the determination of the SAE, and the dewpoint correction factor.

2. The method of claim 1, wherein the optical sensor is a nephelometer.

3. The method of claim 2, wherein the nephelometer is an integrating nephelometer.

4. The method of claim 2, wherein the nephelometer is a multi-wavelength nephelometer.

5. The method of claim 4, wherein the nephelometer has a truncated integrating range from 10-171°.

6. The method of claim 1, wherein the first optical wavelength is in a first range from approximately 410 nm to approximately 490 nm, and the second optical wavelength is in a second range from approximately 590 nm to approximately 680 nm.

7. The method of claim 6, wherein the first optical wavelength is 635 nm, and the second optical wavelength is 450 nm.

8. The method of claim 1, wherein the sharp cut cyclone is a $PM_{2.5}$ sharp cut cyclone.

9. The method of claim 8, wherein the flow rate through the $PM_{2.5}$ sharp-cut cyclone is volumetrically controlled specific to the chosen sharp-cut cyclone.

10. The method of claim 1, wherein an air mass sample heater is included to reduce humidity, so that relative humidity is controlled to be <35%.

11. The method of claim 1, wherein the determining the airborne particle concentration for a range of particle sizes is further based on a function of the SAE that is based at least in part on a curve fit of empirical mass scattering efficiency data plotted against SAE as a surrogate to particle size.

12. The method of claim 11, wherein the function is broken up into segments based on ranges of the SAE.

13. The method of claim 1, wherein the determining the SAE further uses the first optical wavelength and the second optical wavelength.

* * * * *